United States Patent [19]
Faler et al.

[11] Patent Number: 5,830,928
[45] Date of Patent: Nov. 3, 1998

[54] WATERBORNE COATING COMPOSITIONS

[75] Inventors: Dennis L. Faler, Pittsburgh; James R. Franks, Gibsonia; Roxalana L. Martin, Pittsburgh, all of Pa.

[73] Assignee: PPG Industries, Inc., Pittsburgh, Pa.

[21] Appl. No.: 735,989

[22] Filed: Oct. 25, 1996

Related U.S. Application Data

[63] Continuation-in-part of Ser. No. 603,821, Feb. 20, 1996, abandoned.

[51] Int. Cl.$^6$ ........................................................ C08L 51/08
[52] U.S. Cl. .............................. 523/502; 523/501; 525/34; 525/36; 525/169; 525/445
[58] Field of Search ................................ 525/46, 34, 169, 525/445; 523/501, 502

[56] References Cited

U.S. PATENT DOCUMENTS

| T918,011 | 1/1974 | Blount, Jr. et al. | 260/16 |
|---|---|---|---|
| 3,896,098 | 7/1975 | Lasher | 260/872 |
| 3,953,643 | 4/1976 | Cheung et al. | 428/220 |
| 3,953,644 | 4/1976 | Camelon et al. | 428/220 |
| 4,002,700 | 1/1977 | Fukuzaki et al. | 260/872 |
| 4,070,323 | 1/1978 | Vanderhoff et al. | 260/29.6 NR |
| 4,098,745 | 7/1978 | Borman | 260/29.3 |
| 4,220,675 | 9/1980 | Imazaki | 427/27 |
| 4,318,833 | 3/1982 | Guagliardo | 524/457 |
| 4,403,003 | 9/1983 | Backhouse | 427/407.1 |
| 4,489,135 | 12/1984 | Drexler et al. | 428/423.1 |
| 4,539,363 | 9/1985 | Backhouse | 524/460 |
| 4,927,875 | 5/1990 | Maska et al. | 524/457 |
| 5,071,904 | 12/1991 | Martin et al. | 524/458 |
| 5,356,973 | 10/1994 | Taljan et al. | 524/314 |
| 5,401,790 | 3/1995 | Poole et al. | 524/199 |
| 5,415,926 | 5/1995 | Leighton et al. | 428/288 |
| 5,569,715 | 10/1996 | Grandhee | 525/7 |

FOREIGN PATENT DOCUMENTS

| 0 269 059 | 6/1988 | European Pat. Off. . |
|---|---|---|
| 0 308 115 | 3/1989 | European Pat. Off. . |
| 0 317 640 | 5/1989 | European Pat. Off. . |
| 0 401 565 | 12/1990 | European Pat. Off. . |
| 1373531 | 11/1974 | United Kingdom . |
| 1403794 | 8/1975 | United Kingdom . |
| 1419199 | 12/1975 | United Kingdom . |
| 2006229 | 5/1979 | United Kingdom . |
| 2 038 846 | 7/1980 | United Kingdom . |

OTHER PUBLICATIONS

Patent Abstracts of Japan, vol. 10, No. 280, Sep. 1986 for JP 61–101513, May 1986.
Abstract of Japan, vol. 12, No. 132 (C–490) [2979], Apr. 22, 1988 for JP–A–62 252 478 (Mitsu Petrochem Ind.) Apr. 11, 1987.
Backhouse, "Routes to Low Pollution Glamour Metallic Automotive Finishes" Journal of Coatings Technology, vol. 54, No. 693, Oct. 1982, pp. 83–90.
Pearson, "Water–Based Basecoat for Automotive Industry", Polymer Paint Colour Journal, vol. 177, No. 4195, Jul. 1987.
Oberflache + JOT, "Water–Based Enamel. Has the Breakthrough Succeeded?", Sep. 1985, pp. 48–49.

*Primary Examiner*—Patricia A. Short
*Attorney, Agent, or Firm*—Kenneth J. Stachel; Paul S. Chirgott

[57] ABSTRACT

The present invention provides a waterborne coating composition which includes a polymeric film-forming resin. The polymeric film-forming resin includes a dispersion of polymeric microparticles prepared by forming, in aqueous medium, a mixture of: (a) an unsaturated, substantially hydrophobic polyester component, and (b) an ethylenically unsaturated monomer component. With various hydrophobic polyesters, the ethylenically unsaturated monomer component of the polymeric film-forming resin includes: (a) an acrylamide or methacrylamide with N-methylol or N-alkoxymethyl functionality, (b) an alpha-beta ethylenically unsaturated compound with carboxyl functionality, and (c) an alpha-beta ethylenically unsaturated compound with no additional reactive functionality. Such a waterborne coating composition has a low V.O.C., provides added stiffness, does not block, and can be applied in such a manner that it does not substantially mask the texture of the nonwoven fabrics and/or textiles over which it is applied. When the hydrophobic polyester is prepared with polycarboxylic acid and about 45 to 75 percent by weight 2,2,4-trimethyl-1,3-pentanediol, and about 0 to 23 percent by weight 2-ethyl-2-(hydroxymethyl)-1,3-propanediol, various mixtures of ethylenically unsaturated monomer(s) can be used. The percents by weight are based on total weight of the substantially hydrophobic polyester mixtures of ethylenically unsaturated monomer(s). These are particularized into microparticles by high-stress techniques followed by polymerizing the polymerizable species to form the polymeric microparticles which are stably dispersed in the aqueous medium.

11 Claims, No Drawings

WATERBORNE COATING COMPOSITIONS

CROSS REFERENCE TO RELATED APPLICATIONS

This application is a continuation-in-part application of U.S. patent application Ser. No. 08/603,821, filed on Feb. 20, 1996, now abandoned.

FIELD OF THE INVENTION

The present invention pertains to waterborne coating compositions that have an improved appearance and improved humidity resistance as coatings on substrates and that can have low volatile organic content for coating nonwoven fabric and/or textile substrates.

Waterborne coating compositions are gaining in interest in various coating industries to provide more environmentally friendly products. For instance, an ongoing trend in the automotive industry is to reduce atmospheric pollution that may result when volatile solvents are emitted during the painting process, and one approach to this end has been to develop waterborne coating compositions. Also, in the production of nonwoven fabrics and textile substrates, added required stiffness can be imparted to the textile substrate by a polymer-based coating composition. If employed, such polymer-based coatings are typically applied as either solvent, aqueous emulsion, or hot-melt based formulations. An example of such coated textile substrates are nonwoven fabric and/or textiles used in the manufacture of pleated, horizontal window blinds.

In attempting to provide waterborne or water base coatings for such applications, the characteristics provided by the nonaqueous base coatings for the myriad types of substrates must also be achieved by the water base coatings. For instance, coatings in the automotive industry especially outermost layer coatings of composite coating systems should yield sleek, smooth finishes. Unfortunately, many of the waterborne coating compositions commercially available often have a poor appearance upon application. This is particularly noticeable in the currently popular metallic coatings. The metallic coating compositions tend to have poor pattern control; that is, orientation of the metallic flake pigment, which results in poor appearance. Control of pigment orientation in metallic high solids coatings provides a lustrous shiny appearance ("brightness of face") in the cured films along with excellent flop. The term "flop" refers to the visual change in brightness or lightness of the metallic coating as the viewing angle changes; that is, a change from 90 to 180 degrees. The greater the contrast from light to dark appearance with respect to viewing angle, the better the flop. Flop is a desirable appearance property because it accentuates the contours of a curved surface such as on an automobile body. Also another drawback to some waterborne coating compositions for various substrates has been a less than desirable humidity resistance of the cured coatings. After prolonged exposure to 100% humidity conditions, cured waterborne coatings often blush or even blister with loss of adhesion between coating layers.

Also in the application of coatings to textile or fabric type substrates the application and workplace environments need to comply with various rules and regulations which limit the volatile organic content ("V.O.C.") of coating compositions. The term "V.O.C.", as used herein, is defined as pounds of volatile organic compounds (e.g., solvents and/or amines) per gallon, minus the volume of water. Hence, it is desirable to formulate polymer-based coating compositions which are to be applied over a nonwoven fabric or textile such that the composition has a low V.O.C. As used herein, the term "low V.O.C." refers to a volatile organic content less than about 2.0 pounds per gallon. From an environmental and health standpoint, coating compositions with a V.O.C. of zero are most desirable. However, from an application and manufacturing standpoint, it is often more economically feasible to formulate the coating such that it has a V.O.C. greater than about 2.0 pounds per gallon.

Once again the water base coatings with lower V.O.C. should closely match the performance in a similar manner to the nonaqueous coatings with higher V.O.C. For example, the water base coatings should be like solvent-base coating compositions designed for application over nonwoven fabrics and/or textiles in their ease of application and curing. Such solvent-base coatings often have a V.O.C. typically greater than about 2.0, often greater than about 3.0, and even sometimes greater than 4.0 pounds per gallon. Also the water-base coatings must have polymers that coalesce properly like aqueous emulsion-base polymer coatings that have coalescing solvents. These latter coatings usually have a V.O.C. less than about 4.0 pounds per gallon, often, their V.O.C. is greater than 2.0 pounds per gallon, where the amount of the coalescing solvent often drives the V.O.C. of the resulting composition above 2.0 pounds per gallon.

Other desirable properties that the water base coatings need to fulfill like their higher V.O.C. counterparts that give stiffness to textile substrates are nonblocking and nonmasking finishes. As used herein, the terms "block" or "blocking" refer to a phenomenon wherein the coated substrates stick together when placed onto each other, coated-side to coated-side, and subjected to pressure. Also, the texture of the substrate may be a desirable feature and, if so, should not be masked by the coating.

Therefore, it would be desirable to provide waterborne coating compositions that can be formulated into compositions and even metallic waterborne coating compositions which are useful as original finishes for automobiles and which have improved appearance and humidity resistance, or that can be formulated into coatings for textile or nonwoven substrates to provide stiffness at lower V.O.C. without increasing adverse effects such as blocking or masking.

SUMMARY OF THE INVENTION

Accordingly, it is an object of the present invention to provide a waterborne coating composition having a polymeric film forming resin: 1) that is self-crosslinkable, and/or 2) that has present at least one crosslinking agent; and, optionally, that has at least one pigment. The polymeric film forming resin comprises the reaction product of: (A) an unsaturated, substantially hydrophobic polyester and (B) at least one type or a mixture of ethylenically unsaturated monomers. The (A) polyester is itself the reaction product of at least one hydroxyl functional monomer with a hydroxyl functionality of two or more, and polyacid functional monomer with an acid functionality of at least two. The (B) ethylenically unsaturated monomer or mixture is at least one vinyl monomer when 2,2,4,-trimethyl-1,3-pentanediol and up to 23 percent by weight of the hydrophobic polyester component of 2-ethyl-2-(hydroxymethyl)-1,3-propanediol or trimethylolpropane are used as the at least one hydroxyl functional monomer for the hydrophobic polyester. Otherwise, the (B) ethylenically unsaturated monomer is the specific reaction product of a mixture of vinyl monomers of: (a) an acrylamide or methacrylamide with N-methylol or N-alkoxymethyl functionality, (b) an alpha-beta ethylenically unsaturated compound with carboxyl functionality, and (c) an alpha-beta ethylenically unsaturated compound with no additional reactive functionality.

In one aspect of the invention, the waterborne coating composition is a non-blocking, low V.O.C. coating composition which does not require the use of a coalescing solvent and which can be applied over a nonwoven fabric and/or textile substrate, such that it provides added stiffness to that substrate and does not significantly mask the substrate's texture. In this aspect the polymeric film forming resin is self-crosslinkable and the polymeric film-forming resin comprises the reaction product of: (a) an unsaturated, substantially hydrophobic polyester component, and (b) an ethylenically unsaturated monomer component comprising: (i) an acrylamide or methacrylamide with N-methylol or N-alkoxymethyl functionality, (ii) an alpha-beta ethylenically unsaturated compound with carboxyl functionality, and (iii) an alpha-beta ethylenically unsaturated compound with no additional reactive functionality.

For the aspect of the invention of the textile coating typically, the hydrophobic polyester component is present in the polymeric film-forming resin in an amount ranging from about 20 to about 60 weight percent based upon the total weight of the ethylenically unsaturated monomer component and the hydrophobic polyester component present therein. Moreover, the hydrophobic polyester component typically has a number average molecular weight greater than about 300 as measured by gel permeation chromatography using a polystyrene standard. Also in this aspect the waterborne coating composition does not require the use of a coalescing solvent and has a low V.O.C. It also provides added stiffness, does not block, and can be applied in such a manner that it does not substantially mask the texture of the nonwoven fabrics and/or textiles over which it is applied.

In another aspect of the invention the waterborne coating has a pigment and at least one crosslinking agent, along with the polymeric film-forming resin. In this aspect the polymeric film-forming resin is a latex which comprises a dispersion of polymeric microparticles prepared by forming a mixture in aqueous medium of an ethylenically unsaturated monomer or mixture of ethylenically unsaturated monomers with greater than 30 percent by weight of the substantially hydrophobic polyester, the percent by weight being based on weight of ethylenically unsaturated monomer(s) and hydrophobic polyester. The polyester has a number average molecular weight greater than about 600 as measured by gel permeation chromatography using a polystyrene standard, and is prepared from about 25 to 32 percent by weight fumaric or maleic acid or anhydride or mixtures thereof, based on total weight of the substantially hydrophobic polyester, about 45 to 75 percent by weight 2,2,4-trimethyl-1,3-pentanediol, based on total weight of the substantially hydrophobic polyester, and about 0 to 23 percent by weight 2-ethyl-2-(hydroxymethyl)-1,3-propanediol, based on total weight of the substantially hydrophobic polyester. The mixture of ethylenically unsaturated monomer(s) and hydrophobic polyester is particularized into microparticles by high-stress techniques followed by polymerizing the polymerizable species to form the polymeric microparticles which are stably dispersed in the aqueous medium.

DETAILED DESCRIPTION OF THE INVENTION

Typically, the polymeric film-forming resin is present in the waterborne coating composition in an amount ranging from about 20 to about 100 weight percent. In the application where the waterborne coating composition is formulated for coating onto nonwoven fabrics and/or textiles, the polymeric film-forming resin is preferably present in the waterborne coating composition in an amount from about 50 to about 100 weight percent, and more preferably from about 75 to about 100 weight percent. When the film-forming waterborne coating composition of the present invention comprises a dispersion of polymeric microparticles in aqueous medium as a polymeric film-forming resin, the polymeric film-forming resin is present in the waterborne coating composition in amounts of about 20 percent to 80 percent. These weight percentages are based upon the total weight of resin solids in the waterborne coating composition.

The polymeric film-forming resin can be and typically is a dispersion of polymeric microparticles prepared by forming, in aqueous medium, a reaction product of a mixture of: (a) a substantially hydrophobic polyester, and (b) an ethylenically unsaturated monomer or monomers. Generally, the microparticles contain greater than 20 percent by weight of a substantially hydrophobic polyester, the percent by weight being based on weight of ethylenically unsaturated monomer(s) and hydrophobic polyester. By "substantially hydrophobic", it is meant that upon mixing a sample of polyester, an organic component such as a solvent, and water, a majority of the polyester is in the organic phase and a separate aqueous phase can be observed. Preferably, for improved humidity resistance and appearance properties (hereinafter in the specification and claims "Improved Coating Properties"), the microparticles contain about 40 to 60 percent by weight of a substantially hydrophobic polyester. For the low V.O.C. textile coating application (hereinafter in the specification and claims the "Textile Coating"), the hydrophobic polyester is typically present in the polymeric film-forming resin in an amount ranging from about 20 to about 60 weight percent, preferably, from about 25 to about 55 weight percent, and more preferably from about 30 to about 50 weight percent.

Generally, the hydrophobic polyester of the polymeric film-forming resin typically has a number average molecular weight greater than about 300. For the Textile Coating, the number average molecular weight of the hydrophobic polyester component ranges from about 300 to about 10,000, more preferably from about 400 to about 5,000, and even more preferably from about 500 to about 3,000. For the Improved Coating Properties, the substantially hydrophobic polyester has a number average molecular weight greater than about 600, preferably about 900 to 1500, more preferably about 1000 to 1300. The term "number average molecular weight", as used herein, refers to a number average molecular weight as determined by gel permeation chromatography using polystyrene as standard, as known to those skilled in the art. Therefore, it is not an absolute number average molecular weight which is measured, but a number average molecular weight which is a measure relative to a set of polystyrene standards.

In both the Improved Coating Properties and Textile Coating applications, the polyester is adapted to be chemically bound into the cured coating composition; that is, the polyester contains free functional groups such as carboxyl and hydroxyl groups. In the former application with the use of various vinyl monomers these free functional groups are capable of reacting with a crosslinking agent. In the latter application with specific vinyl monomers, these free functional groups are capable of self crosslinking with the specific vinyl monomers.

For the Improved Coating Properties application where various vinyl monomers can be used, the substantially hydrophobic polyester may be prepared in a known manner by condensation of specific polyhydric alcohols and polycarboxylic acids. Suitable specific polyhydric alcohols include 2,2,4-trimethyl-1,3-pentanediol with or without 2-ethyl-2-(hydroxymethyl)-1,3-propanediol or trimethylolpropane. The 2,2,4-trimethyl-1,3-pentanediol is present in the polyester at about 45 to 75 percent by weight, preferably about 65 to 75 percent by weight, based on total weight of the substantially hydrophobic polyester; and the 2-ethyl-2-(hydroxymethyl)-1,3-propanediol is present in the polyester at about 0 to 23 percent by weight, preferably about 0 to 5 percent by weight, based on total weight of the substantially hydrophobic polyester.

Also for the aforementioned diols, suitable polycarboxylic acids include fumaric acid, maleic acid and functional equivalents thereof such as anhydrides or lower alkyl esters and half esters. Mixtures of acids may also be used. Maleic anhydride is preferred. The polycarboxylic acid is present in the polyester at about 20 to 35 percent by weight, preferably about 25 to 30 percent by weight, based on total weight of the substantially hydrophobic polyester. The total amount of the weight percentages for the one or both aforementioned specific polyhydric alcohols and at least one polycarboxylic acid should be around 100 weight percent. The ratio of the specific polyhydric alcohols to polycarboxylic acid can be any ratio of polyhydric alcohol to polycarboxylic acid known to those skilled in the art of preparing polyester polymers.

Also preferably in this application, the hydrophobic polyester is essentially free of repeating vinyl or acrylic functionality. This means that the polyester polymer is not prepared from typical free radically polymerizable monomers such as acrylates, styrene, and the like known to those skilled in the art.

The hydrophobic polyester for Textile Coatings when the specific vinyl monomers are used for the polymeric film forming resin can have some unsaturation. Such unsaturation means that the hydrophobic polyester component has at least some unsaturation along its backbone. Typically, for this application, there is at least about 0.1 equivalents of unsaturation per 100 grams of the hydrophobic polyester component, preferably at least about 0.15 equivalents of unsaturation per 100 grams, and more preferably at least about 0.2 equivalents of unsaturation per 100 grams.

Also in this application with the specific vinyl monomers, the hydrophobic polyester typically comprises the reaction product of: (a) polyhydroxy functional monomers having a hydroxyl functionality of at least two, and (b) polyacid functional monomers having an acid functionality of at least two. Examples of suitable polyhydroxy functional monomers which can be used when practicing this textile coating aspect of the invention include: 2,2,4-trimethyl-1,3-pentanediol, 2-ethyl-2-(hydroxymethyl)-1,3-propanediol, 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol and sorbitol.

It is presently preferred to use, as the polyhydroxy functional monomer for the hydrophobic polyester, a blend of a polyol having a hydroxyl functionality of 2 and a polyol having a hydroxyl functionality greater than 2. For example, one of the polyols can be 2,2,4-trimethyl-1,3-pentanediol and the other polyol employed can be 2-ethyl-2-(hydroxymethyl)-1,3-propanediol. The former would typically be present in the polyester in an amount ranging from about 45 to about 80 weight percent, preferably from about 50 to about 75 weight percent, while the latter would typically be present in an amount ranging from about 20 to about 55 weight percent, and preferably from about 25 to about 50 weight percent. These weight percentages are based upon the total weight of the hydrophobic polyester component and the weight percentages should total to 100 weight percent.

The polyacid functional monomer component of the hydrophobic polyester for Textile Coating application can have at least 50 percent unsaturation. Typically, the degree of unsaturation for the polyacid functional monomer component ranges from about 60 to about 100 percent, preferably from about 70 to about 100 percent, and more preferably from about 80 to about 100 percent. Examples of suitable polyacid functional monomers which can be used for Textile Coatings are the same as the aforementioned polyacid functional monomers for the Improved Coating Properties application. The polyacid functional monomer is typically present in the polyester in an amount ranging from about 20 to about 35 weight percent, preferably from about 25 to about 30 weight percent. These weight percentages are based upon the total eight of the hydrophobic polyester component.

Various ethylenically unsaturated monomer or mixture of ethylenically unsaturated monomers can form a reaction product with the hydrophobic polyester of the specific polyhydric alcohols. Although the reaction product with these monomers is not completely reacted but allows for additional crosslinking type reactions with a crosslinking agent, these reactions can occur through the sundry functional groups of the reaction product. Additionally, these vinyl monomers including a mixture of them can constitute the balance of the microparticle. Such various ethylenically unsaturated monomers or mixture of ethylenically unsaturated monomers are selected from acrylic and vinyl monomers. The acrylic monomers include alkyl esters of acrylic acid or methacrylic acid. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyalkyl acrylates, and hydroxyalkyl methacrylates. Also, the acrylic polymer can be prepared with N-(alkoxymethyl)acrylamides and N-(alkoxymethyl)methacrylamides.

The polymeric microparticle may or may not be internally crosslinked. When the microparticles are internally crosslinked, they are referred to as a microgel. Monomers used in preparing the microparticle so as to render it internally crosslinked include those ethylenically unsaturated monomers having more than one site of unsaturation, such as ethylene glycol dimethacrylate, which is preferred, allyl methacrylate, hexanediol diacrylate, methacrylic anhydride, tetraethylene glycol diacrylate, tripropylene glycol diacrylate, and the like.

For the Textile Coating aspect of the invention, specific vinyl monomers are used to provide a self-crosslinking feature for the reaction product of the hydrophobic polyester and one or more vinyl monomers. These specific ethylenically unsaturated monomers for the polymeric film-forming resin comprise: (a) an acrylamide or methacrylamide with N-methylol or N-alkoxymethyl functionality, (b) an alpha-beta ethylenically unsaturated compound with carboxyl functionality, and (c) an alpha-beta ethylenically unsaturated compound with no additional reactive functionality. The specific ethylenically unsaturated monomers of the polymeric film-forming resin is typically present in an amount ranging from about 80 to about 40 weight percent, preferably from about 75 to about 45 weight percent, and more preferably from about 70 to about 50 weight percent. These weight percentages are based upon the total weight of the ethylenically unsaturated monomer component and the hydrophobic polyester component present in the polymeric film-forming resin, and the total of these weight percentages for the unsaturated monomer component and the hydrophobic polyester component should equal 100 weight percent.

The acrylamides or methacrylamides with N-methylol or N-alkoxymethyl functionality are typically present in an amount ranging from about 1 to about 15 weight percent, preferably from about 2 to about 10 weight percent, and more preferably from about 3 to about 8 weight percent. These weight percentages are based upon the total weight of the ethylenically unsaturated monomer component. Examples of acrylamides or methacrylamides with N-methylol or N-alkoxymethyl functionality which can be used when practicing this invention include: N-methylol acrylamide, N-methylol methacrylamide, N-ethoxymethyl acrylamide, N-butoxymethyl acrylamide and mixtures thereof.

The alpha-beta ethylenically unsaturated compounds with carboxyl functionality are typically present in an amount ranging from about 0.1 to about 15 weight percent, preferably from about 0.5 to about 10 weight percent, and more preferably from about 1 to about 5 weight percent. These weight percentages are based upon the total weight of the ethylenically unsaturated monomer component. Examples of alpha-beta ethylenically unsaturated compounds with carboxyl functionality which can be used when practicing this invention include: acrylic acid and methacrylic acid.

Also, the specific ethylenically unsaturated monomers are typically comprised of the alpha-beta ethylenically unsaturated compounds with no additional reactive functionality. As used herein, the term "no additional reactive functionality" as it refers to alpha-beta ethylenically unsaturated compounds, means those compositions which do not react with the acrylamides or methacrylamides with N-methylol or N-alkoxymethyl functionality present in the ethylenically unsaturated monomer component. Preferably, this ethylenically unsaturated monomer constitutes the balance of the specific ethylenically unsaturated monomers.

Typically, alpha-beta ethylenically unsaturated compounds with no additional reactive functionality are present in an amount ranging from about 1 to about 80 weight percent, preferably from about 10 to about 70 weight percent, and more preferably from about 20 to about 60 weight percent. These weight percentages are based upon the total weight of the ethylenically unsaturated monomer component. Examples of alpha-beta ethylenically unsaturated compounds with no additional reactive functionality which can be used when practicing this invention include: alkyl esters of acrylic and methacrylic acid, such as methyl acrylate, methyl methacrylate, butyl acrylate, butyl methacrylate, 2-ethylhexyl acrylate, 2-ethylhexyl methacrylate, styrene, acrylamide, acrylonitrile, alkyl esters of maleic and fumaric acid, vinyl and vinylidene halides, ethylene glycol dimethacrylate, isobornyl methacrylate, vinyl acetate, vinyl ethers, allyl ethers and lauryl methacrylate.

The polymeric film-forming resin made in accordance with the Textile Coating aspect of the present invention also is typically in the form of microparticles as is that for the Improved Coating Properties aspect of the invention.

The dispersion of polymeric microparticles in aqueous medium is prepared by a high-stress technique using a homogenizer. This technique is described in U.S. Pat. No. 5,071,904, columns 5 to 7, incorporated herein by reference. In this technique, the monomer(s) and hydrophobic polyester are mixed together to form a pre-emulsion and particularized into microparticles by subjecting the pre-emulsion to high shear stress using a homogenizer. The ethylenically unsaturated monomer(s) are then polymerized to form polymeric microparticles which are stably dispersed in the aqueous medium.

Although the waterborne coating composition of the present invention may be cationic, anionic or nonionic, preferably it is anionic.

The mixture of the hydrophobic polyester component and the ethylenically unsaturated monomer component is preferably prepared by a high-stress technique which is described more fully below. It should be noted that, in order to practice this high-stress technique, prior to mixing together the hydrophobic polyester component and the ethylenically unsaturated monomer component, the hydrophobic polyester component should have a Gardner-Holdt viscosity of less than about Z10. Preferably, the hydrophobic polyester component should have a Gardner-Holdt viscosity of less than about Z6, and more preferably of less than about Z.

Specifically, if the viscosity of the hydrophobic polyester component is too great, it will be difficult to blend it thoroughly with the ethylenically unsaturated monomer component. Accordingly, if the hydrophobic polyester component has a Gardner-Holdt viscosity which is greater than about Z6, its viscosity should be lowered prior to mixing it with the ethylenically unsaturated monomer component. One practice which can be employed to lower the viscosity of the hydrophobic polyester component is to use a thinning agent. Examples of thinning agents include: organic solvents and acrylic monomers.

If organic solvents are employed as the thinning agent, they should not be used in a concentration such that the V.O.C. of the resulting polymeric film-forming resin is greater than about 2.0 pounds per gallon for the Textile Coating aspect of the invention, preferably not greater than about 1.5 pounds per gallon, and more preferably not greater than about 1.0 pound per gallon. On the other hand, if acrylic monomers are employed as the thinning agent, they should not be permitted to react with the hydrophobic polyester component until at least after the addition of the ethylenically unsaturated monomer component. This can be achieved by employing such acrylic monomers which would react with the hydrophobic polyester component under certain conditions (e.g., at elevated temperatures).

In one preferred embodiment for the Textile Coating, an acrylic monomer is employed as the thinning agent; and the acrylic monomer is a portion of: (a) the acrylamide or methacrylamide with N-methylol or N-alkoxymethyl functionality, (b) the alpha-beta ethylenically unsaturated compound with carboxyl functionality, and/or (c) the alpha-beta ethylenically unsaturated compound with no additional reactive functionality.

The ethylenically unsaturated monomer component and the hydrophobic polyester component are hereinafter collectively referred to as the "organic component". The organic component can further comprise other organic species and/or organic solvents. When present, for the Textile Coating, the concentration of such organic species and/or organic solvents should not increase the V.O.C. of the resulting polymer film-forming resin to a level which is greater than about 2.0 pounds per gallon, preferably such that the resulting V.O.C. of the polymeric film-forming resin is not greater than about 1.5 pounds per gallon, and more preferably such that the resulting V.O.C. of the polymeric film-forming resin is not greater than about 1.0 pound per gallon.

After the hydrophobic polyester component is at the proper viscosity, it is mixed with the ethylenically unsaturated monomer component. Once the mixture is blended together, it is subjected to stress in order to particulate it into microparticles. It is important when practicing this invention that the polymer microparticle dispersion is such that the particle size is uniformly small. Typically, less than about 20 percent of the polymer microparticles have a mean diameter greater than about 5 microns.

The aqueous medium provides the continuous phase of dispersion in which the microparticles are suspended. The aqueous medium is generally exclusively water. For some applications, however, solvents (e.g., coalescing solvents) may be employed. In most instances, it is not necessary to use any solvent when preparing the polymeric film-forming resin in accordance with the present invention.

Notwithstanding the above, if a solvent is employed in formulating the polymeric film-forming resin, it should not be present in a concentration such that the resulting V.O.C. of the-polymeric film-forming resin is not greater than about 2.0 pounds per gallon, preferably such that the resulting V.O.C. of the polymeric film-forming resin is not greater than about 1.5 pounds per gallon, and more preferably such that the resulting V.O.C. of the polymeric film-forming resin is not greater than about 1.0 pound per gallon.

If employed, one can include such solvents during the synthesis of the polymeric film-forming resin or in the hydrophobic polyester component or the ethylenically unsaturated monomer component, or both, prior to blending these components together. Examples of suitable water insoluble solvents which can be incorporated in the organic component include: benzyl alcohol, xylene, methyl isobutyl ketone, mineral spirits, butanol, butyl acetate, tributyl phosphate, dibutyl phthalate and mixtures thereof.

As was mentioned above, the mixture of the hydrophobic polyester component and the ethylenically unsaturated monomer component is subjected to the appropriate stress. One means for exerting such a stress is by use of a MICROFLUIDIZER® emulsifier which is available from Microfluidics Corporation in Newton, Mass.

The MICROFLUIDIZER® high pressure impingement emulsifier is disclosed in U.S. Pat. No. 4,533,254 which is incorporated herein by reference. The device consists of a high pressure (up to 20,000 psi) pump and an interaction chamber where the emulsification takes place. The pump forces the mixture of reactants in aqueous medium into the chamber where it is split into at least two streams which pass at very high velocity through at least two slits and collide resulting in the particulation of the mixture into small particles. Generally, the reaction mixture is passed through the emulsifier once at a pressure 5,000 and 15,000 psi. Multiple passes can result in smaller average particle size and a narrower range for the particle size distribution.

When using the aforesaid MICROFLUIDIZER® emulsifier, stress is applied by liquid-liquid impingement as has been described. However, it should be understood that, if desired, other modes of applying stress to the pre-emulsification mixture can be utilized so long as sufficient stress is applied to achieve the requisite particle size distribution (i.e., such that after polymerization less than about 20 percent of the polymer microparticles have a mean diameter greater than about 5 microns). For example, one alternative manner of applying stress would be the use of ultrasonic energy.

Stress is described as force per unit area. Although the precise mechanism by which the MICROFLUIDIZER® emulsifier stresses the pre-emulsification mixture to particulate, it is not thoroughly understood; it is theorized that stress is exerted in more than one manner. It is believed that one manner in which stress is exerted is by shear. "Shear" means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the pre-emulsification mixture.

Once the mixture has been particulated into microparticles, the polymerizable species within each particle are polymerized under conditions sufficient to produce polymer microparticles which are stably dispersed in the aqueous medium. In order to have stably dispersed microparticles, a surfactant is typically employed. If employed, surfactants are typically present in a concentration less than about 15 weight percent. Preferably, surfactants are present in a concentration ranging from about 0.5 to about 10 weight percent, more preferably from about 1 to about 10 weight percent, and even more preferably from about 1.5 to about 5 weight percent. These percentages are based upon the total weight of resin solids in the waterborne coating composition.

The surfactant is preferably present when the organic component referred to above is mixed into the aqueous medium prior to particulation. Alternatively, the surfactant can be introduced into the medium at a point just after the particulation within the MICROFLUIDIZER® emulsifier. The surfactant, however, can be an important part of the particle forming process and is often necessary to achieve the requisite dispersion stability. The surfactant can be a material whose role is to prevent the emulsified particles from agglomerating to form larger particles.

The same surfactants or dispersants which can be utilized during conventional emulsion polymerization are also suitable for this high-stress technique. Examples of suitable surfactants include: anionic and nonionic surfactants. Preferably, the surfactants are selected from the group consisting of: the dimethylethanolamine salt of dodecylbenzenesulfonic acid, sodium dioctylsulfosuccinate, ethoxylated nonylphenol and sodium dodecyl benzene sulfonate. Other materials well known to those skilled in the art are also suitable herein.

In order to conduct the free radical polymerization of the polymerizable species, a free radical initiator is also typically employed. Both water soluble and oil soluble initiators can be used. Since the addition of certain initiators, such as redox initiators, can result in a strong exothermic reaction, it is generally desirable to add the initiator to the other ingredients immediately before the reaction is to be conducted.

Examples of water soluble initiators which can be used when practicing this invention include: ammonium peroxydisulfate, potassium peroxydisulfate and hydrogen peroxide. Examples of oil soluble initiators which can be used include: t-butyl hydroperoxide, dilauryl peroxide, t-butyl perbenzoate and 2,2'-azobis (isobutyronitrile). Preferably, redox initiators such as ammonium peroxydisulfate/sodium metabisulfite or t-butylhydroperoxide isoascorbic acid are employed.

It should be understood that, in some instances, it may be desirable to add some of the reactant species (e.g., water soluble acrylic monomers such as hydroxypropyl methacrylate) after particulation of the remaining reactants and the aqueous medium. Although not necessary for practicing this invention, if present, such reactant species are typically present in an amount less than about 10 weight percent, preferably less than about 8 weight percent, and more preferably less than about 6 weight percent. These weight percentages are based upon the total resin solids of the waterborne coating composition.

The particulated mixture is then subjected to conditions sufficient to induce polymerization of the polymerizable species within the microparticles. The particular conditions will vary depending upon the actual materials being polymerized.

The progress of the polymerization reaction can be followed by techniques conventionally known to those skilled in the art of polymer chemistry. For example, heat generation, monomer concentration and percent of total solids are all methods of monitoring the progress of the polymerization which can be used when practicing this invention.

The aqueous microparticle dispersions can be prepared by a batch process or a continuous process. In one batch process the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours.

In an alternative batch process, a reactor vessel is charged with the entire amount of microdispersion to be polymerized. Polymerization commences when an appropriate initiator such as a redox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated. In a continuous process the pre-emulsion or mixture of raw materials is passed through the homogenizer to make a microdispersion which is immediately passed through a heated tube (e.g., stainless steel) or a heat exchanger in which polymerization takes place. The initiator is added to the microdispersion just before it enters the tubing.

It is preferred to use redox-type initiators in the continuous process since other initiators can produce gases such as nitrogen or carbon dioxide which can cause the latex to spurt out of the reaction tubing prematurely. The temperature of reaction can range from about 25° C. to about 80° C., and preferably from about 35° C. to about 45° C. The residence time typically ranges from about 5 minutes to about 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature. If there is still free monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the polymer formed from the polymerizable species and the substantially hydrophobic polyester are contained within each microparticle. The aqueous medium, therefore, is substantially free of water soluble polymer.

The resultant polymer microparticles are insoluble in the aqueous medium. In saying that the aqueous medium is substantially free of water soluble polymer, it is intended that the term "substantially free" means that the aqueous medium contains no more than about 30 percent by weight of dissolved polymer, and preferably no more than about 20 weight percent.

By "stably dispersed", it is meant that the polymer microparticles do not settle upon standing and do not coagulate or flocculate on standing. Typically, when diluted to about 50 percent total solids, the microparticle dispersions do not settle, even when aged for one month at room temperature.

As was stated above, one aspect of the polymer microparticle dispersions of the present invention is that the particle size is uniformly small. Typically, after polymerization, less than about 20 percent of the polymer microparticles have a mean diameter which is greater than about 5 microns. Preferably, after polymerization, less than about 20 percent of the polymer microparticles have a mean diameter which is greater than about 1 micron. Generally, the microparticles have a mean diameter ranging from about 0.01 micron to about 10 microns. Preferably, the mean diameter of the particles after polymerization ranges from about 0.05 micron to about 0.5 micron.

The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

The microparticle dispersions of the present invention are high solids materials of low viscosity. Dispersions can be prepared directly with a total solids content ranging from about 45 percent to about 60 percent. They can also be prepared at a lower solids level ranging from about 30 to about 40 percent total solids and concentrated to a higher level of solids of about 55 to about 65 percent by stripping. The molecular weight of the polymer and viscosity of the claimed aqueous dispersions are independent of each other. The weight average molecular weight can range from a few hundred to greater than 100,000. The Brookfield viscosity can also vary widely from about 0.01 poise to about 100 poise, depending on the solids and composition, preferably from about 0.2 to about 5 poise when measured at 25° C. using an appropriate spindle at 50 rpm.

In addition to a polymeric film-forming resin, the waterborne coating composition of the present invention can optionally contain a pigment component. Any suitable pigment can be used. Examples of suitable pigments include: inorganic pigments (e.g., titanium dioxide, iron oxides, chromium oxide, lead chromate and carbon black), organic pigments (e.g., phthalocyanine blue and phthalocyanine green) and mixtures thereof.

If employed, the pigment component is typically present in the waterborne coating composition in an amount ranging from about 1 to about 80 weight percent, preferably from about 1 to about 50 weight percent, and more preferably from about 1 to about 30 weight percent. These weight percentages are based upon the total weight of resin solids in the waterborne coating composition.

If desired, the waterborne coating composition may also contain other optional materials well known in the art of formulated surface coatings. Examples of such other optional materials include: flow control agents, thixotropic agents, fillers, anti-gassing agents, organic co-solvents, catalysts and mixtures thereof. These other optional materials typically constitute less than about 50 weight percent, preferably less than about 40 weight percent, and more preferably less than about 30 weight percent. These weight percentages are based upon the total weight of resin solids in the waterborne coating composition.

The waterborne coating composition of the present invention can be applied at high application solids (i.e., greater than about 30 percent). These waterborne coating compositions have good leveling and flow characteristics. Moreover, they have excellent cure response and humidity resistance, as well as low V.O.C.

Generally, waterborne coating compositions prepared in accordance with the present invention have a V.O.C. which is less than about 2.0 pounds per gallon, preferably less than about 1.5 pound per gallon, and more preferably less than about 1.0 pound per gallon.

Coating compositions of the present invention can be applied to various substrates to which they adhere. Examples of such suitable substrates include: woods, metals, glass, plastic, foam, nonwoven fabrics and textiles. They are, however, particularly useful for application over those nonwoven fabrics and textiles which require additional stiffness.

The waterborne coating compositions can be applied by any suitable means. Examples of such suitable application means include: brushing, dipping, flow coating and spraying.

If the waterborne coating composition of the present invention is applied over a nonwoven fabric or textile substrate, it is typically not possible to determine a film thickness since the coating is drawn into the substrate. However, if the waterborne coating composition of the present invention is applied over non-porous substrate, it is typically applied such that the coating thickness ranges from about 0.1 to about 5 mils (i.e., from about 2.54 to about 127 microns), and preferably from about 0.4 to about 1.5 mils (i.e., from about 10.16 to about 38.1 microns).

Suitable crosslinking agents that can be present in the waterborne coating composition of the present invention, particularly in the Improved Coating Properties aspect, are the amine or amide-aldehyde condensates (aminoplasts) or the polyisocyanate curing agents as are well known in the art. Examples of suitable crosslinking agents are given in U.S. Pat. No. 5,071,904. Aminoplast crosslinking agents are preferred. The crosslinking agent is present in the waterborne coating composition in amounts of about 10 percent to 40 percent, based on total weight of resin solids in the coating composition.

The coating composition can further contain pigments to give it color. Color pigments conventionally used in surface coatings include inorganic pigments such as titanium dioxide, iron oxides, chromium oxide, lead chromate, and carbon black, and organic pigments such as phthalocyanine blue and phthalocyanine green. Mixtures of the above-mentioned pigments may also be used.

Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica, nickel flakes, tin flakes, and mixtures thereof.

In general, the pigment is incorporated into the coating composition in amounts of about 1 to 80 percent, usually about 1 to 30 percent by weight based on total weight of the coating composition.

If desired, the coating composition may contain other optional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The waterborne coating composition of the present invention can be applied at high application solids; i.e., greater than 30 percent. The compositions have good leveling and flow characteristics, exhibiting an excellent automotive quality finish, demonstrated by the excellent appearance with respect to flop. The composition also has excellent cure response and humidity resistance, as well as low volatile organic content. Generally, the volatile organic content is less than about 3.5 pounds per gallon, usually less than 3.0 pounds per gallon, and preferably less than about 2.5 pounds per gallon.

Coating compositions of the present invention can be applied to various substrates to which they adhere, including wood, metals, glass, cloth plastic, foam, including elastomeric substrates and the like. They are particularly useful in applying over metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the coating composition to the substrate, ambient relative humidity may range from about 30 to about 80 percent, preferably about 50 percent to 70 percent.

A film of the coating is formed on the substrate during application of the coating composition to the substrate. Typically, the coating thickness will be about 0.1 to 5 mils (2.54 to 127 microns), preferably 0.4 to 1.5 mils (10.16 to 38.1 microns) in thickness.

The waterborne coating composition of the present invention may be used as a monocoat or with other coating compositions. It is preferably used as the colored base coat layer in a "color-plus-clear" coating system.

After application of the waterborne coating to the substrate, a film is formed on the surface of the substrate by driving water out of the film by heating or by an air drying period. When the coating composition of the present invention is used as a base coat, the heating will preferably be only for a short period of time and will be sufficient to ensure that a topcoat, such as a clearcoat, can be applied to the coating if desired without the former dissolving the base coat composition. Suitable drying conditions will depend on the particular base coat composition and on the ambient humidity, but in general a drying time of from about 1 to 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes.

After application of the coating composition and any desired clearcoats, the coated substrate is heated to cure the coating layers. In the curing operation, solvents are driven off and the film-forming materials of the clearcoat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clearcoat is usually from about 0.5–5 mils (12.7 to 127 microns), preferably 1.2–3 mils (30.48 to 76.2 microns).

The invention will further be described by reference to the following examples. Unless otherwise indicated, all parts are by weight.

EXAMPLES

Examples I and II illustrate the preparation of ethylenically unsaturated polyesters and polymeric film-forming resins. Examples III and IV and VI illustrate the preparation of waterborne coating compositions prepared in accordance with the present invention. Example V evaluates the performance of the waterborne coating when applied to textiles. Example VII evaluates the performance of the waterborne coating for Improved Coating Properties on substrates.

EXAMPLE IA and IB

Preparation of Polyester (Example IA)

A polyester pre-polymer comprising 67.2 percent by weight trimethylpentanediol (TMPD), 4.6 percent by weight trimethylolpropane (TMP), and 28.2 percent by weight maleic anhydride was prepared in a four-neck round bottom flask equipped with a thermometer, mechanical stirrer, condenser, dry nitrogen sparge and a heating mantle. The following ingredients were used:

|  | Material | Weight (grams) A | Weight (grams) C |
|---|---|---|---|
| Charge 1 | Trimethylpentanediol | 4205.0 | 1533 |
|  | Trimethylolpropane | 292.0 | — |
|  | Maleic anhydride | 1764.0 | 588 |
|  | Dibutyltindioxide | 6.3 | 2.1 |
|  | Triphenyl phosphite | 6.3 | 2.2 |
| Charge 2 | Butyl acrylate | 1484.0 | 503 |
|  | 2,6-Ditertiarybutyl p-cresol | 9.0 |  |
|  | Ionol (butylated hydroxytoluene) | — | 2.5 |
|  | TOTAL | 7766.6 |  |

Charge-1 was added to the round bottom flask and, with stirring, brought to and held at a temperature of 200° C. until 654 milliliters of distillate was collected and the acid value dropped to less than 2. The material was cooled to a temperature below 100° C. Thereafter, charge-2 was added thereto while stirring to lower the viscosity of the polyester. It should be noted that, at 100° C., charge-2 did not react with charge-1.

The resulting mixture was cooled to room temperature and transferred to an appropriate container. The final product had a hydroxyl value of 160, a Gardner-Holdt viscosity of V-W, a number average molecular weight of 1125, and a non-volatile content of 71.2% by weight (determined by weight loss of a sample after one hour at 110° C.).

Preparation of Polyester (Example IB)

A second polyester prepolymer was prepared from 64 percent by weight trimethylpentanediol (TMPD), 7.3 percent by weight trimethylolpropane (TMP), and 28.7 percent by weight maleic anhydride using the same technique as that described in Example IA. The final product had a hydroxyl value of 207, a Gardner-Holdt viscosity of X-Y, a number average molecular weight of 962, and a non-volatile content of 72.3% (determined by weight loss of a sample after one hour at 110° C.).

Preparation of Polyester (Example IC)

A third polyester prepolymer was prepared from 72.3 percent by weight trimethylpentanediol (TMPD) and 27.7 percent by weight maleic anhydride in a four-neck round bottom flask equipped with a thermometer, mechanical stirrer, condenser, dry nitrogen sparge, and a heating mantle from the above-specified components. The first four ingredients were stirred in the flask at 200° C. until 160 ml of distillate was collected and the acid value dropped to 1.0. The material was cooled to <100° C. and the last two ingredients were stirred in. The final product had a hydroxyl value of 306, a Gardner-Holdt viscosity of T-U, a number average molecular weight of 1027, and a non-volatile content of 71.2%.

A fourth polyester prepolymer, ID was prepared from a polyester prepolymer comprising 59.7 percent by weight trimethylpentanediol (TMPD), 13.6 percent by weight trimethylolpropane (TMP), and 26.7 percent by weight maleic anhydride using the same technique as that described in Example IB. The final product had a hydroxyl value of 164, a Gardner-Holdt viscosity of W, a number average molecular weight of 1107, and a nonvolatile content of 69%.

EXAMPLE IIA, IIB, IIC, IID and IIE

Preparation of Polymeric Film-Forming Resin

Polymeric film-forming resins IIA, IIB, and IIC were prepared from the following ingredients:

|  | Weight (grams) | | |
|---|---|---|---|
| Material | A | B | C |
| Charge-1 | | | |
| Polyester of Example IA | 500 | 500[3] | — |
| Polyester of Example IB | — | — | 500[3] |
| Methyl methacrylate | 400 | 175 | 180 |
| ethylene glycol dimethacrylate | — | 60 | 30 |
| Butyl acrylate | 50 | 230 | 270 |
| N-methylol acrylamide | 83.3 | 20.8[4] | — |

-continued

| Material | Weight (grams) | | |
|---|---|---|---|
| | A | B | C |
| Acrylic acid | 10 | 25 | 20 |
| Dodecylbenzenesulfonic acid | 28.6 | 28.6[(5)] | 28.6[(5)] |
| IGEPAL CO-897[1] | 14.3 | — | — |
| Ferrous ammonium sulfate (1% in deionized water) | 5 | 2.0 | 2.0 |
| Deionized water | 1148 | 900 | 900 |
| Charge-2 | | | |
| Dimethylethanolamine | 8.9 | 8 | 8 |
| Charge-3 | | | |
| Isoascrobic acid | 3 | 3 | 3 |
| Deionized water | 13 | 30 | 30 |
| Charge-4 | | | |
| Hydrogen peroxide (35% in deionized water) | 4.4 | 2 | 2 |
| Deionized water | 50 | 238 | 238 |
| Charge-5 | | | |
| Isoascrobic acid | 1 | — | — |
| Deionized water | 10 | — | — |
| Charge-6 | | | |
| Hydrogen peroxide (35% in deionized water) | 1 | — | — |
| Deionized water | 10 | — | — |
| Charge-7 | | | |
| PROXEL GXL[2] | 2 | — | |
| deionized water | 15 | — | |

[1]IGEPAL CO-897 is an ethoxylated nonylphenol based surfactant available commercially from Rhone-Poulenc.
[2]PROXEL GXL is a fungicide based on 1,2-benzisothiazoline 3-one and is available commercially from Zeneca.
[3]400 grams of polyester in 100 grams of butyl acrylate
[4]48 percent in water
[5]70 percent in isopropanol For both Examples IIA and IIB Charge-1 was mixed in a stainless steel beaker using an impeller stir blade. The pH of the mixture was adjusted to 5 through the addition of charge-2. The resulting emulsion was then passed once through a MICROFLUIDIZER® M110T at 7,000 psi for Example IIA and 5,000 psi for Example IIB. The respective microfluidized materials were transferred to separate four-neck round bottom flasks equipped with an overhead stirrer, condenser, thermometer and a dry nitrogen atmosphere.

For Example IIA at room temperature, charge-3 was added, followed by charge-4, over a period of five minutes. The resulting polymerization produced an exotherm over a period of 14 minutes peaking at 57° C. The contents of the flask were then cooled to a temperature of 25° C., followed by the consecutive additions of charges 5 and 6. Upon the completion of charge-6, an exotherm peaking at 33° C. was observed. The resulting polymeric film-forming resin was then transferred to a suitable container. The final pH of the latex was 5.0, the non-volatile content was 42.6% by weight (as determined at 110° C. for one hour), the Brookfield viscosity was 40 cps (Brookfield RVT Synchro-Lectric Viscometer, Spindle #1 at 50 rpm) and the V.O.C. was about 0.2 pound per gallon.

For Example IIB, charge-3 was added, followed by charge-4, over a period of one hour. The temperature of the reaction mixture increased from 26° C. to 52° C. The reaction mixture cooled to 30° C. and 324.2 grams of 50 percent aqueous diisopropanolamine was added. The final pH of the latex was 8.0 and the nonvolatile content was 43.1 percent.

For Example IIC the latex was prepared from the pre-emulsion using the same experimental technique as that described in Example IIB. The final pH of the latex was 8.0 and the nonvolatile content was 44.8.

Another latex was prepared as Example IID which used the same experimental technique as that described in Example IIC, using the polyester of Example IC. The final pH of the latex was 8.0, the nonvolatile content was 44.4%, and the Brookfield viscosity was 40 cps (spindle #1, 50 rpm).

Another latex of the polymeric film forming resin, IIE, was prepared using the same experimental technique as that described in Example IIC, using the polyester of Example ID. The final pH of the latex was 8.0 and the nonvolatile content was 44%.

EXAMPLE III

Preparation of a Clear Coating Composition

| Charge | Material | Weight (grams) |
|---|---|---|
| 1 | Polymeric resin of Example IIA | 350 |
| 2 | Ammonium hydroxide (28% aqueous) | 0.8 |
| 3 | ACRYSOL ASE-60[1] | 6 |
| 4 | Ammonium hydroxide (28% aqueous) | 1.6 |
| | TOTAL | 358.4 |

[1]ACRYSOL ASE-60 is an acrylic based latex thickening agent available commerically from Rohm & Haas.

Charge-1 was added to a mixing container. With agitation, using a variable speed stir blade, the pH of the polymeric resin was increased to 8 through the addition of charge-2. The mixture was allowed to stir at a high rate of shear for at least five minutes. With continued stirring, charge-3 was added slowly, followed by high shear mixing for at least five minutes.

Under continued mixing, the pH of the mixture was further raised to 9 through the addition of charge-4, followed by high shear mixing for at least ten minutes. The coating formulation is then allowed to stand at room temperature for 24 hours, for equilibration. The coating had a viscosity of 17,419 cps (Brookfield Digital Viscometer Cone & Plate, Model DV-II, using a #52 Cone Spindle) and a V.O.C. of about 0.2 pound per gallon.

EXAMPLE IV

Preparation of a Tinted Coating Composition

| Charge | Material | Weight (grams) |
|---|---|---|
| 1 | Polymeric resin of Example IIA | 85.3 |
| 1 | DREWPLUS L-464[1] | 0.56 |
| 2 | 96-2 (black tint)[2] | 1.4 |
| 2 | 96-4 (green tint)[2] | 1.3 |
| 2 | 96-23 (white tint)[2] | 11.2 |
| 3 | Ammonium hydroxide (28% aqueous) | 0.2 |
| 4 | ACRYSOL ASE-60 | 1.5 |
| 5 | Ammonium hydroxide (28% aqueous) | 0.4 |
| | TOTAL | 101.9 |

[1]DREWPLUS L-464 is a silicone based foam control agent available commercially from Drew Industrial.
[2]The 96-2, -4, and -23 additives are exterior durable trade-sales tints available commercially from PPG Industries, Inc.

Charge-1 was added to a container and allowed to mix thoroughly. The tints of charge-2 were added sequentially using a Series400 Accutinter, followed by vigorous mixing in a paint-shaker. The pH of the tinted latex was increased to a value of 8 through the addition of charge-3.

The mixture was allowed to stir at a high rate of shear for at least five minutes. With continued stirring, charge-4 was added slowly, followed by high shear mixing for at least five minutes. Under continued mixing the pH of the mixture was further raised to 9 through the addition of charge-5, followed by high shear mixing for at least ten minutes.

The tinted coating formulation was then allowed to stand at room temperature for 24 hours, for equilibration. The textile coating was found to have a viscosity of 19,000 cps (Brookfield RVT Synchro-Lectric Viscometer, #6-spindle, 20 rpm) and a V.O.C. of about 0.6 pound per gallon.

EXAMPLE V

Performance Testing of Coating Compositions

The coatings formulations of Examples III and IV were applied over nonwoven spun-lace polyester based substrates as follows. The nonwoven spun-lace polyester substrates were attached to a cold-rolled steel panels using masking tape, and preheated for at least 15 minutes in an electric oven set at 163° C. The coatings were applied within 15 seconds of removing the pre-heated substrates from the oven.

The coatings are applied through the use of a the one mil side of a P.G. & T. Company No. 14 square draw-down block. Within 5 seconds of completing the draw-down, the coated substrates were placed in an electric oven set at 204° C. for about 60 seconds. After cooling to room temperature, the coated substrates were removed from the panels. Any portions of the textile substrate that came into direct contact with the masking tape were cut away and disposed of prior to evaluation.

The nonwoven spun-lace polyester substrates coated with the coatings formulations of Examples II and IV were noticeably stiffer and could more easily be folded into pleats than their uncoated counterparts. Moreover, the texture of the substrates over which the coatings were applied was clearly discernible.

Blocking tests were performed on the nonwoven spun-lace polyester substrates coated with the textile coatings formulations of Examples III and IV. The blocking tests involved first cutting the coated nonwoven spun-lace substrates into 8.3×10.2 centimeter pieces. These pieces were then folded over on themselves, coated side to coated side.

The coated and folded substrates were placed in an electric oven at 99° C. for about 16 hours, under a weight the size and dimensions of which were sufficient to impart a pressure of 15 pounds/square inch onto the folded substrates. After the 16-hour heating/pressing period, the substrates were removed from the oven and unfolded. The results observed were as follows:

| Coating Formulation | Blocking Test Results |
|---|---|
| Example III | No blocking[1] |
| Example IV | No blocking |

[1]The term "No blocking" indicates that the coated substrates showed no evidence of sticking together, coated-side to coated-side.

EXAMPLE VI

Preparation of Coatings

A silver waterborne coating composition was prepared with the following ingredients:

| | Premix: | |
|---|---|---|
| Material | Example VI-A(g)[7] | Example VI-C(g)[7] |
| propylene glycol monobutyl ether | 1536 g | 18.9 |
| propylene glycol monomethyl ether | 168 g | 2.0 |
| polypropylene glycol[1] | 680 g | 12.0 |
| CYMEL 1130[2] | 1064 g | 18.8 |
| TINUVIN 1130[3] | 192 g | 3.4 |
| aluminum pigment[4] | 1304 g | 23.0 |
| phosphatized epoxy[5] | 109 g | 1.9 |
| RESIMENE 755[6] | 352 g | 6.2 |
| dodecylbenzenesulfonic acid (70% in isopropanol) | | 1.3 |
| Diisopropanolamine (50% in water) | | 1.0 |
| water | | 20.0 |

[1]Molecular weight 425, available from Arco Chemicals Co.
[2]Methylated/butylated melamine formaldehyde resin, available from Cytec Industries.
[3]Substituted benzotriazole UV light stabilizer, available from Ciba Geigy Corporation.
[4]Hydrolux Stapa, available from Obron Atlantic Corporation.
[5]Phosphatized epoxy prepared from EPON 828, a polyglycidyl ether of Bisphenol A, available from Shell Oil and Chemical Co., reacted with phosphoric acid in an 83:17 weight ratio.
[6]Methylated/butylated melamine formaldehyde resin, available from Monsanto Chemical Company.
[7]"g." is grams.

The 245g of the Premix, 27.3 g of water, and 15.5 g diisopropanolamine (50% in water) were added to 362 g of the latex from Example IIB under agitation. The final composition had a pH of 8.6 and a viscosity of 23.9 seconds, measured using a #4 Ford cup.

For Example VI-B, a silver waterborne coating composition was prepared as in Example VI-A using the latex of Example IIC. The final composition had a pH of about 8.6 and a viscosity of 23 seconds, measured using a #4 Ford cup.

For Example VI-C all of Premix 2, 88.2 g of Premix 1, and 74.0 g of water were added to 139.2 g of the latex from Example IID under agitation. The final composition had a pH of 8.6 and a viscosity of 16.9 seconds, measured using a #4 Ford cup.

For Example VI-D a silver waterborne coating composition was prepared as in Example VI-A, using the latex of Example IIE. The final composition had a pH of about 8.5 and a viscosity of 17.6 seconds, measured using a #4 Ford cup.

EXAMPLE VII

The coatings of Examples VI-A and VI-B were spray applied in two coats to electrocoated steel panels at room temperature and at relative humidities of 60 % and 80%. After applying the second coat, a 5-minute flash at 200° F. (93.3° C.) was allowed before application of a clear coat available from PPG Industries, Inc. as DCT-5001. The clear coat was applied in two coats with a 90-second flash between coats. Each panel was given a 15-minute flash at room temperature and then cured for 30 minutes at 285° F. (140° C.). The film thickness of the basecoat was 0.59 mils (15.0 microns) and the thickness of the clearcoat was 1.7 mils (43.2 microns).

The cured films were evaluated for gloss, distinctness of image (DOI) and cross-hatch adhesion both initially after cure and after five days in condensing humidity at 140° F. (46° C.). The cured films were also evaluated for flop initially after cure. Gloss was measured at a 20° angle with a Glossmeter instrument commercially available from Hunter Lab. DOI was measured with a Dorigon II instrument commercially available from Hunter Lab. Condensing humidity exposure resistance was measured with a QCT Condensation Tester commercially available from Q Panel Company. Cross-hatch adhesion was measured with a Paint Adhesion Test Kit commercially available from Paul N. Gardner Company, Inc., using ASTM D 3359 test method. A rating of 5 indicates no loss of adhesion and a rating of 0 indicates complete loss of adhesion. Flop was measured using an ALCOPE LMR-200 Laser Multiple Reflectometer instrument commercially available from Alesco.

A comparison was made among the formulations described in Examples VI-A and VI-B and BWB 9021, a waterborne basecoat commercially available from PPG Industries, Inc. The results are reported in Table 1 below.

TABLE 1

|  | Example VI-A | Example VI-B | BWB 9021 |
|---|---|---|---|
| Gloss (20°) | 91/91[2] | 84/88 | 82/13 |
| DOI | 79/57 | 89/85 | 58/9 |
| Adhesion | 5/5 | 5/5 | 5/0 |
| Flop[1] (60% relative humidity) | 1.23 | 1.38 | 1.42 |
| Flop[1] (80% relative humidity) | 1.4 | 1.46 | 1.27 |

[1]Numbers reported are a measure of the visual change in brightness or lightness of the metallic coating due to incident light reflection as the viewing angle changes, that is, a change from 90 to 180 degrees. Higher flop numbers indicate greater contrast from light to dark appearance as the viewing angle (and angle of incident light) increases.
[2]Numbers reported are for data collected before/after humidity exposure.

The data in Table 1 illustrate the dramatically improved humidity resistance obtained with the coating composition of the present invention with respect to gloss, DOI, and adhesion properties compared to the commercial system. The coatings described in Examples VI-A and VI-B also had noticeably better appearances than the BWB 9021 with respect to flop when applied at 80% relative humidity.

The coatings of Examples VI-C and VI-D were spray applied in two coats to electrocoated steel panels at room temperature and at a relative humidity of 60%. After applying the second coat, a 5-minute flash at 200° F. (93.3° C.) was allowed before application of a clear coat available from PPG Industries, Inc. as DCT-5001. The clear coat was applied in two coats with a 90-second flash between coats. Each panel was given a 15-minute flash at room temperature and then cured for 30 minutes at 285° F. (140° C.). The film thickness of the basecoat was 0.52 mils (13.2 microns) and the thickness of the clearcoat was 2.1 mils (53.3 microns).

The cured films were evaluated for gloss, distinctness of image (DOI) and cross-hatch adhesion both initially after cure and after five days in condensing humidity at 120° F. (35° C.).

A comparison was made among the formulations described in Examples VI-C and VI-D and BWB 9021. Results are reported in Table 2 below.

TABLE 2

|  | Example VI-C | Example VI-D | BWB 9021 |
|---|---|---|---|
| Gloss (20°) | 85/88 | 86/89 | 82/84 |
| DOI | 87/84 | 83/85 | 64/62 |
| Adhesion | 5/5 | 5/5 | 5–/3 |

The data in Table 2 illustrate the improved humidity resistance obtained with coating compositions of the present invention with respect to gloss, and more notably, DOI and adhesion properties, compared to the commercial system. The coatings described in Examples VI-C and VI-D also had noticeably better appearances than the BWB 9021 with respect to smoothness.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A waterborne coating composition comprising a polymeric film-forming resin, wherein said polymeric film forming resin comprises the reaction product of:
   (a) an unsaturated, substantially hydrophobic polyester component, and
   (b) an ethylenically unsaturated monomer component comprising:
      (i) an acrylamide or methacrylamide with N-methylol or N-alkoxymethyl functionality present in an amount ranging from about 2 to about 15 weight percent;
      (ii) an alpha-beta ethylenically unsaturated compound with carboxyl functionality present in an amount ranging from about 0.1 to about 15 weight percent; and
      (iii) an alpha-beta ethylenically unsaturated compound with no additional reactive functionality present in an amount ranging from about 1 to about 80 weight percent, wherein said weight percentages for (i), (ii) and (iii) are based upon the total weight of the ethylenically unsaturated monomer component (b).

2. The coating composition recited in claim 1 wherein the polymeric film-forming resin is present in an amount ranging from about 25 to 100 weight percent, said weight percentage being based on the total weight of the resin solids in the coating composition.

3. The coating composition recited in claim 1 wherein the hydrophobic polyester component is present in an amount ranging from about 20 to 60 weight percent, said weight percentage being based upon the total weight of the hydrophobic polyester component and the ethylenically unsaturated monomer component.

4. The coating composition recited in claim 1 wherein the hydrophobic polyester component has a number average molecular weight greater than about 300.

5. The coating composition recited in claim 1 wherein the hydrophobic polyester component comprises the reaction product of:
   (a) a first polyhydroxy functional monomer having a hydroxyl functionality of two and a second polyhydroxy functional monomer having a hydroxyl functionality greater than two, and
   (b) polyacid functional monomers having an acid functionality of at least two.

6. The coating composition recited in claim 1 wherein the polymeric film-forming resin is in the form of microparticles, and wherein less than 20 percent of the microparticles have a mean diameter greater than five microns.

7. The coating composition recited in claim 1 wherein the volatile organic content of the polymeric film-forming resin is less than about 2.0 pounds per gallon.

8. The coating composition recited in claim 1 further comprising a surfactant component, said surfactant component being present in an amount which is less than 15 weight percent based upon the total weight of the resin solids in the coating composition.

9. The coating composition recited in claim 1 further comprising a pigment component.

10. A waterborne coating composition comprising a polymeric film-forming resin, wherein said polymeric film forming resin comprises the reaction product of:
(a) an unsaturated, substantially hydrophobic polyester component, comprising the reaction product of:
   (i) a first polyhydroxy functional monomer that is 2,2,4-trimethyl-1,3-pentanediol and a second polyhydroxy functional monomer that is trimethylolpropane, and
   (ii) polyacid functional monomers having an acid functionality of at least two; and
(b) an ethylenically unsaturated monomer component comprising:
   (i) an acrylamide or methacrylamide with N-methylol or N-alkoxymethyl functionality present in an amount ranging from about 1 to about 15 weight percent;
   (ii) an alpha-beta ethylenically unsaturated compound with carboxyl functionality present in an amount ranging from about 0.1 to about 15 weight percent; and
   (iii) an alpha-beta ethylenically unsaturated compound with no additional reactive functionality present in an amount ranging from about 1 to about 80 weight percent, wherein said weight percentages for (bi), (bii) and (biii) are based upon the total weight of the ethylenically unsaturated monomer component (b).

11. A waterborne coating composition comprising a polymeric film-forming resin, wherein said polymeric film forming resin comprises the reaction product of:
(a) an unsaturated, substantially hydrophobic polyester component, and
(b) an ethylenically unsaturated monomer component comprising:
   (i) an acrylamide or methacrylamide with N-methylol or N-alkoxymethyl functional acrylamide or methacrylamide comprising N-methylol acrylamide present in an amount ranging from about 1 to about 15 weight percent;
   (ii) an alpha-beta ethylenically unsaturated compound with carboxyl functionality present in an amount ranging from about 0.1 to about 15 weight percent; and
   (iii) an alpha-beta ethylenically unsaturated compound with no additional reactive functionality present in an amount ranging from about 1 to about 80 weight percent, wherein said weight percentages for (i), (ii) and (iii) are based upon the total weight of the ethylenically unsaturated monomer component (b).

* * * * *